(12) United States Patent
Leray et al.

(10) Patent No.: US 6,397,894 B2
(45) Date of Patent: Jun. 4, 2002

(54) MULTILAYER HOSE FOR TRANSPORTING HOT FLUIDS

(75) Inventors: Fabrice Leray, Maison en Champagne; Frédéric Maitay, Vitry le Francois, both of (FR)

(73) Assignee: Hozelock Tricoflex SA, Rueil Malmaison (FR)

( * ) Notice: Subject to any disclaimer, the term of this patent is extended or adjusted under 35 U.S.C. 154(b) by 0 days.

(21) Appl. No.: 09/760,746

(22) Filed: Jan. 17, 2001

(30) Foreign Application Priority Data

Jan. 17, 2000 (FR) .............................. 00 00520

(51) Int. Cl.[7] .............................. F16L 11/115
(52) U.S. Cl. .................. 138/125; 138/137; 138/140; 138/141
(58) Field of Search .................. 138/137, 140, 138/141, 123, 125

(56) References Cited

U.S. PATENT DOCUMENTS 3,988,188 A * 10/1976 Johansen et al. ............ 138/125
4,007,070 A    2/1977 Busdiecker ................. 138/123
4,791,965 A   12/1988 Wynn ......................... 138/146

FOREIGN PATENT DOCUMENTS

GB   2099753 A   12/1982
GB   2271160 A    4/1994

* cited by examiner

Primary Examiner—Patrick Brinson
(74) Attorney, Agent, or Firm—Birch, Stewart, Kolasch & Birch, LLP

(57) ABSTRACT

The present invention provides a multilayer hose comprising:
  a flexible inner layer of polyvinyl chloride having high molecular weight;
  a flexible linking layer of polyvinyl chloride having medium molecular weight;
  a reinforcing structure based on plastics material fibers; and
  a flexible outer layer of polyvinyl chloride having molecular weight greater than that of the linking layer.

The invention also provides a method of making the hose.

10 Claims, 1 Drawing Sheet

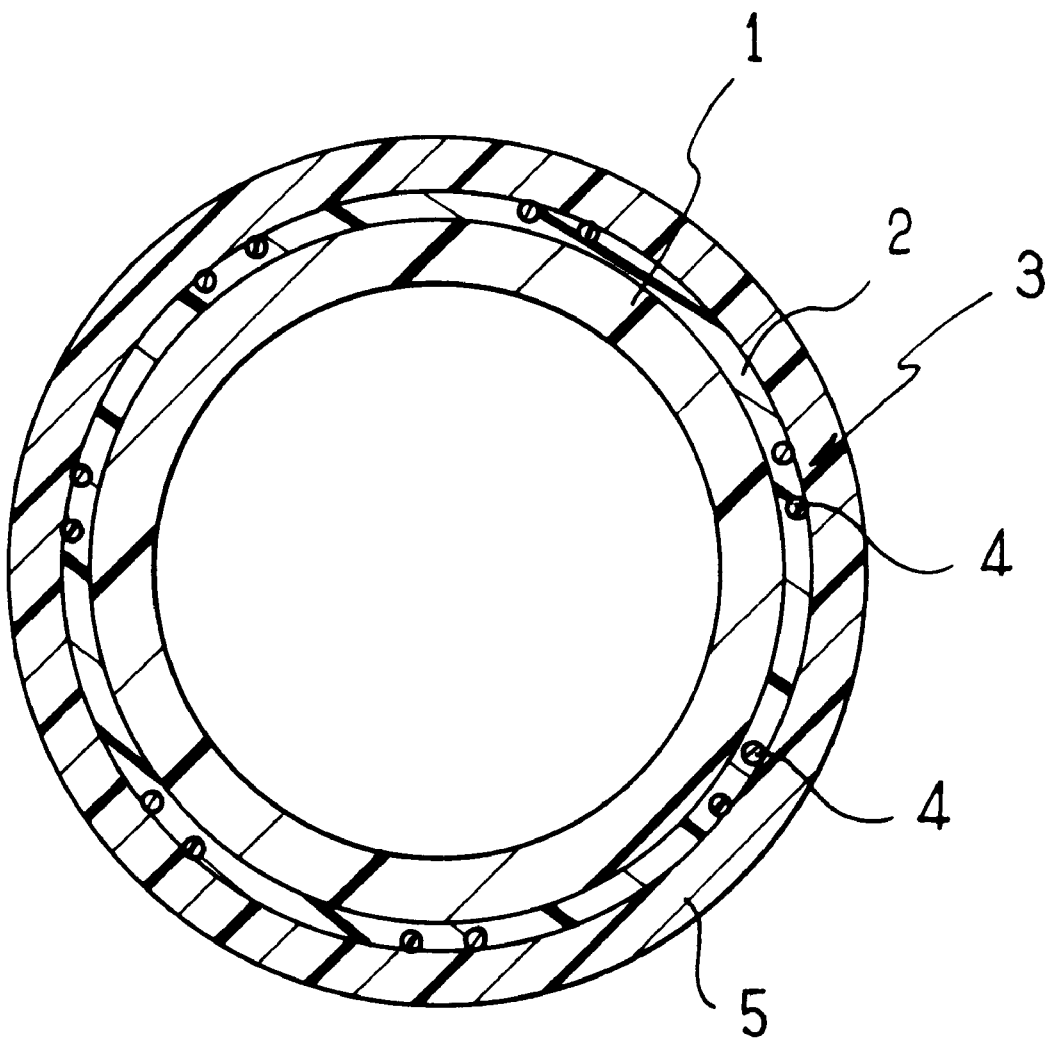

MULTILAYER HOSE FOR TRANSPORTING HOT FLUIDS

The present invention relates to a multilayer hose for transporting hot fluids, and in particular for transporting hot water.

BACKGROUND OF THE INVENTION

In the field of transporting hot water, hoses are known that are made in conventional manner of thermoplastic material such as polyvinyl chloride. The polyvinyl chloride used is a standard polyvinyl chloride giving a mean k-value of about 70. Such hoses are well suited to transporting hot water whose temperature does not exceed 75° C. and they are of food grade quality so they can be used for transporting potable water. Above that temperature, the hose tends to deform and runs the risk of bursting and/or of becoming detached from couplings. In addition, those hoses which are normally flexible tend to become hard after being used a few times at temperatures in excess of 75° C.

For transporting fluids, and more particularly water, at temperatures higher than 75° C., use is made of hoses made out of elastomer material. Nevertheless, that type of material suffers from the drawbacks of being relatively expensive and usually it is not of food grade quality.

Unfortunately, the water flowing in a potable water distribution network and in the pieces of equipment that are commonly connected thereto at a temperature lying in the range 5° C. to 100° C. on a continuous basis must also be capable of rising to a peak of 120° C. with a maximum operating pressure of about 10 bars.

OBJECTS AND SUMMARY OF THE INVENTION

A multipurpose hose must therefore present properties enabling it to satisfy those constraints, must be of food grade quality, and must withstand the fats that are often present in the environment of hoses of that type. In addition, the hose must be of low cost.

According to the invention, a multilayer hose is provided comprising:

- a flexible inner layer of polyvinyl chloride having high molecular weight;
- a flexible linking layer of polyvinyl chloride having medium molecular weight;
- a reinforcing structure based on plastics material fibers; and
- a flexible outer layer of polyvinyl chloride having molecular weight greater than that of the linking layer.

BRIEF DESCRIPTION OF THE DRAWING

Other characteristics and advantages of the invention will appear on reading the following description of a particular and non-limiting embodiment of the invention.

Reference is made to the sole accompanying FIGURE which is a cross-section through a hose of the invention.

MORE DETAILED DESCRIPTION

The multilayer hose of the invention comprises an inner layer 1 of flexible PVC having high molecular weight, a linking layer 2 of flexible PVC having medium molecular weight covering the outside of the inner layer 1, a reinforcing structure given general reference 3 based on fibers 4 of plastics material extending over the linking layer 2, and an outer layer 5 of flexible polyvinyl chloride having molecular weight that is greater than that of the linking layer 2 and that covers the reinforcing structure 3.

The inner layer 1 is made using a polyvinyl chloride resin having a k-value of about 100. The molecular chains constituting said resin are thus of relatively great length, thereby giving the inner layer 1 relatively good ability to withstand high temperature.

For 100 parts by weight of this resin, the following are added:

- a quantity of dioctyl phthalate (such as the product referenced DOP from Elf Atochem) lying substantially in the range 5 to 15 parts by weight, which product is a lubricant facilitating subsequent extrusion of the material constituting the inner layer 1; and
- a quantity of trimellitates (e.g. the trademark Uraplast 525 from DSM) lying substantially in the range 60 to 70 parts by weight, which product is a plasticizing agent that softens the material.

Optionally, the following can also be added:

- 2.5 to 10 parts by weight of deodorized soy oil (e.g. the trademark Edenol D 82 from Sidorbre Sinnova);
- 0.5 to 5 parts by weight of calcium or zinc stearate (e.g. that referenced CZ 11 from Witco) acting as a lubricant;
- up to 2 parts by weight of a stabilizer such a that referenced CH55 from Witco;
- up to 2 parts by weight of a wetting agent (such a that having the trademark Paraloïd K125 from Rhom & Haas) that improves incorporation of the plasticizer in the resin; and
- up to 2 parts by weight of a pigment such as Kronos 2220 from Industrie du Titane.

The linking layer 2 is made from a polyvinyl chloride resin having a k-value of about 70 which is the standard value on the market.

Optionally, for 100 parts by weight of resin, the linking layer 2 can further comprise:

- a quantity of dioctyl phthalate lying substantially in the range 50 to 60 parts by weight;
- a quantity of deodorized soy oil lying substantially in the range 1 to 5 parts by weight;
- a quantity of calcium or zinc stearate lying substantially in the range 0.5 to 5 parts by weight; and
- up to 0.5 parts by weight of a lubricant such as that referenced Stavinor 8401 from Ceca Ato.

The outer layer 5 is made from a polyvinyl chloride resin having a k-value of about 80. It is also possible to use a polyvinyl chloride resin having a k-value either lying in the range 70 to 80, or a k-value that is greater than 80, e.g. equal to 100 like the resin used for the inner layer 1.

For 100 parts by weight of resin, the outer layer 3 comprises:

- 11 to 26 parts by weight of dioctyl phthalate; and
- 35 to 60 parts by weight of a polymer plasticizer that withstands fats such as that referenced Plaxeter P20 or P80 from Coim.

Optionally, the outer layer 3 can comprise:

- 2.5 to 10 parts by weight of deodorized soy oil;
- 0.5 to 5 parts by weight of calcium or zinc stearate;
- up to 1 part by weight of a lubricant such as Stavinor 8401 from Ceca Ato and up to 2 parts by weight of a lubricant such as that referenced Loxiol G10 from Sidorbre Sinnova;
- up to 20 parts by weight of a filler such as that having the trademark BSH from Omya;

up to 2 parts by weight of a pigment such as that referenced Kronos 2220 from Industrie du Titane; and up to 2 parts by weight of a masterbatch such as that referenced 88892 from SNCI (such a masterbatch comprising a concentrated dye in the form of granules).

The outer layer 5 constituted in this way is particularly good at withstanding fats and provides the hose with good protection.

The fibers 4 of the reinforcing structure 3 are made of polyester in this case, but could also be made of polyamide or of aramid.

The ingredients used in making up the composition of the hose as described above appear in the European list of Resolution A96-5 thus authorizing use of the hose under conditions where it comes briefly and repetitively into contact with water.

The hose is made by extruding together the inner layer 1 and the linking layer 2, then braiding the fibers 4 around the linking layer 2 so that the reinforcing structure 3 covers it. The reinforcing structure 3 can be made, for example, by laying the fibers 4 at an angle that is substantially equal to 50°, and in this case is 50.4°, which angle is said to be "neutral" in that deformation in elongation and in radial expansion is balanced and therefore compensates.

The hose is then subjected to a determined amount of infrared radiation so as to obtain surface melting of the linking layer 2. Other heater means could be used.

The material of the outer layer 5 in a substantially liquid state is then coextruded onto the reinforcing structure 3 and the linking layer 2 through the mesh of the reinforcing structure 3. The number of fibers, the diameter of the fibers, and the size of the mesh are all determined in such a manner as to ensure that there is sufficient adhesion between the linking layer and the outer layer through the reinforcing structure while nevertheless achieving the expected ability to withstand bursting.

Thus, very strong adhesion between the linking layer 2 and the outer layer 3 is obtained, thus enabling the fibers 4 constituting the reinforcing structure 3 to be held in position in particularly effective manner. This makes it possible to avoid portions of the fibers moving locally apart from one another which would risk the hose being punctured. This also gives the hose very good ability to withstand aging.

With the hose as described above, the thickness of the inner layer 1 preferably lies in the range 0.5 mm to 3 mm, that of the linking layer 2 in the range 0.3 mm to 1 mm, and that of the outer layer 5 in the range 0.7 mm to 2 mm. The inner layer 1 has hardness on the Shore A scale lying substantially between 70 and 85, and the outer layer 5 has hardness on the Shore A scale lying substantially in the range 60 to 86.

Naturally, the invention is not limited to the embodiment described and variants can be made thereto without going beyond the ambit of the invention as defined by the claims.

In particular, the various numerical values given represent a compromise that is optimal for obtaining a hose that is flexible, having high mechanical strength and good ability to withstand temperature. Nevertheless, the various values can be modified to adapt the structure of the hose to special conditions of use or as a function of its diameter.

What is claimed is:

1. A multilayer hose, comprising:
    a flexible inner layer of polyvinyl chloride having high molecular weight;
    a flexible linking layer of polyvinyl chloride having medium molecular weight;
    a reinforcing structure based on plastics material fibers; and
    a flexible outer layer of polyvinyl chloride having molecular weight greater than that of the linking layer.

2. A multilayer hose according to claim 1, wherein the inner layer is made from a polyvinyl chloride resin having a k-value of about 100.

3. A multilayer hose according to claim 2, wherein, for 100 parts by weight of polyvinyl chloride, the inner layer comprises:
    a quantity of dioctyl phthalate lying substantially in the range 5 to 15 parts by weight; and
    a quantity of trimellitate lying substantially in the range 60 to 70 parts by weight.

4. A multilayer hose according to claim 2, wherein the linking layer is made on the basis of a polyvinyl chloride resin having a k-value of about 70.

5. A multilayer hose according to claim 2, wherein the outer layer is made from a polyvinyl chloride resin having a k-value of not less than 80.

6. A multilayer pipe according to claim 5, wherein, for 100 parts by weight of polyvinyl chloride resin, the outer layer comprises:
    a quantity of dioctyl phthalate lying substantially in the range 11 to 26 parts by weight; and
    a quantity of plasticizing agent lying substantially in the range 35 to 60 parts by weight.

7. A multilayer hose according to claim 1, wherein the inner layer is of a thickness lying substantially in the range 0.5 mm to 3 mm, the linking layer is of a thickness lying substantially in the range 0.3 mm to 1 mm, and the outer layer is of a thickness lying substantially in the range 0.7 mm to 2 mm.

8. A multilayer hose according to claim 2, wherein the inner layer has hardness on the Shore A scale lying in the range 70 to 85 and the outer layer has hardness on the Shore A scale lying in the range 60 to 86.

9. A multilayer hose according to claim 1, wherein the fibers are taken from a group comprising polyester, polyamide, aramid.

10. A multilayer hose according to claim 1, wherein the fibers are disposed at a laying angle that is substantially equal to 50°.

* * * * *